United States Patent Office.

H. D. NILES AND JAMES C. BROOKS, OF BRISTOLVILLE, OHIO.

IMPROVED COMPOSITION FOR CURING ROT IN SHEEP.

Specification forming part of Letters Patent No. 55,697, dated June 19, 1866.

To all whom it may concern:

Be it known that we, HENRY D. NILES and JAMES C. BROOKS, of Bristolville, county of Trumbull, and State of Ohio, have invented a new Compound for the Cure of Foot-Rot in Sheep; and we do hereby declare that the following is a full and exact description thereof, reference being had to the accompanying ingredients.

The nature of our invention consists in mixing together the different ingredients in about the following proportions: first, coal-tar, one-half ounce; second, alcohol, one-half ounce; third, benzole, one-half ounce; fourth, Venice turpentine, one-quarter ounce; fifth, tincture myrrh, one-quarter ounce; sixth, oil-origanum, one-eighth ounce; seventh, butter of antimony, one-eighth ounce; eighth, sulphuric acid, one-eighth ounce; the whole, when mixed, forming a compound which will effect a speedy and permanent cure when applied to the parts affected.

We first remove the hoof from the diseased portion of the foot with a knife or other convenient means, then heat the compound, and apply it with a swab, when warm, to all parts affected.

The sheep should be kept herded under dry shelter for a sufficient time to allow the compound to have full action.

What we claim as new and our invention, and desire to have secured to us by Letters Patent of the United States, is—

The aforesaid compound, formed of the above-named ingredients, in about the proportions and for the purpose herein set forth and described.

HENRY D. NILES.
JAMES C. BROOKS.

Witnesses:
J. M. ALLEN,
WILLIAM SAYER.